UNITED STATES PATENT OFFICE.

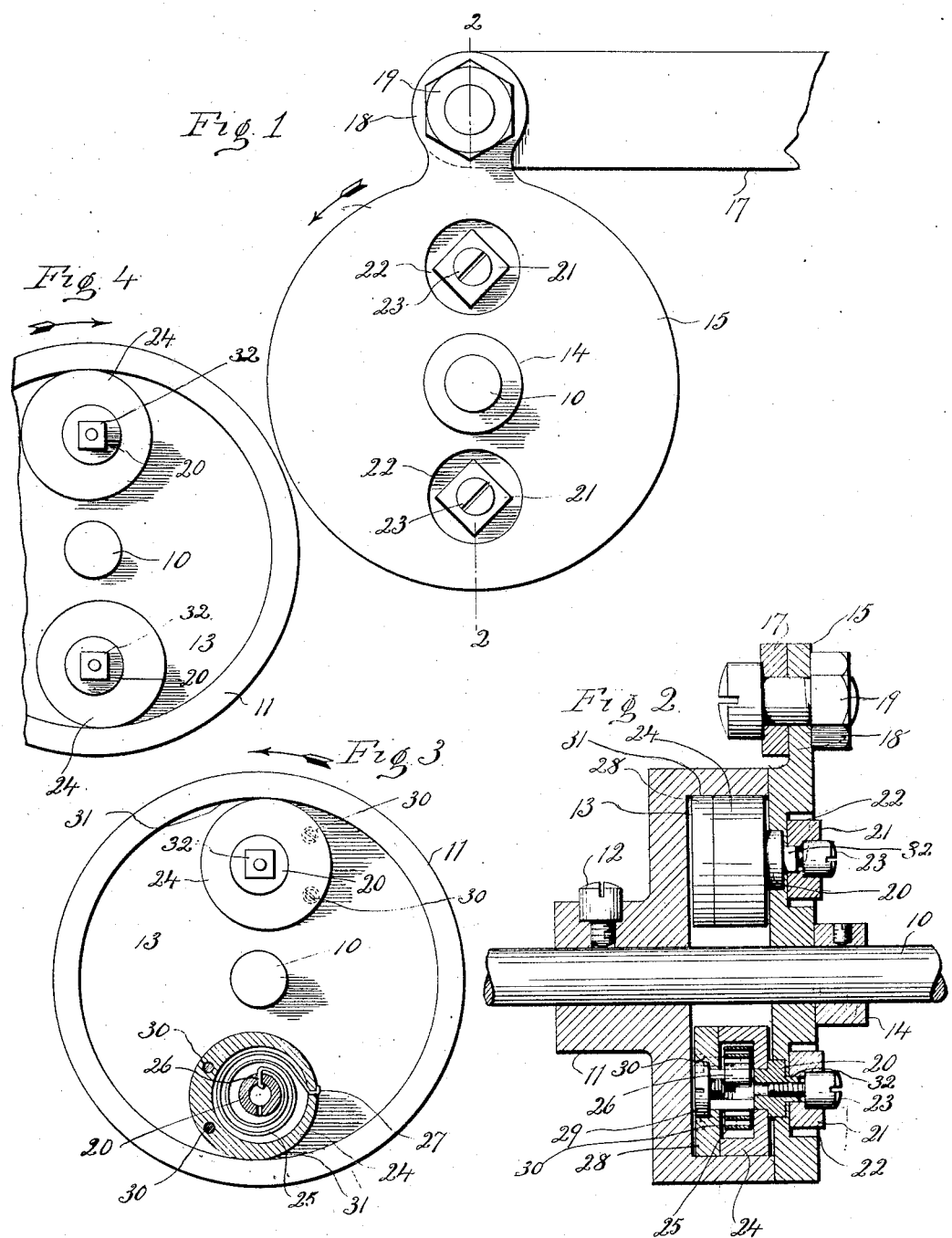

PASQUALE PASQUARIELLO, OF HAMDEN, CONNECTICUT.

RATCHET DEVICE.

1,356,007.  Specification of Letters Patent.  Patented Oct. 19, 1920.

Application filed September 10, 1919. Serial No. 322,905.

*To all whom it may concern:*

Be it known that I, PASQUALE PASQUARIELLO, a subject of Victor Emanuel III, King of Italy, and a resident of Highwood, town of Hamden, in the county of New Haven, State of Connecticut, have invented certain new and useful Improvements in Ratchet Devices, of which the following is a specification, reference being had therein to the accompanying drawings.

My invention relates to a new and improved ratchet device, having for its object, among other things, the construction of such mechanism without the usual pawl and ratchet teeth, that will be silent in its operation, will be quick in its action and capable of adjustment for use in either direction, as may be desired.

To these, and other ends, my invention consists in the ratchet device, having certain details of construction and combinations of parts, as will be hereinafter described and more particularly pointed out in the claims.

Referring to the drawings, in which like numerals of reference designate like parts in the several figures;

Figure 1 is a side view of my improved mechanism;

Fig. 2 is a transverse sectional view thereof, taken upon line 2—2 of Fig. 1;

Fig. 3 is a view of the interior of the mechanism with the roll carrier removed and one of the rolls being in section; and Fig. 4 is a similar view with the position of the rolls reversed.

In the drawings, the numeral 10 designates a shaft that is mounted in journals, not shown, and to which is fixed the roll case 11 by the screw 12 or by any other convenient means. This roll case is provided with a circular pocket or recess 13 in one side thereof. The roll carrier 15 is rotatably mounted on the shaft 10 and held against endwise movement thereon by reason of the contact of said carrier with the face of said roll case on one side and the collar 14 on the other side. This roll carrier is operated from a rotary part (not shown), through a link 17 that has connection through the bolt 19 with the arm 18 upon said carrier. Mounted on the roll carrier 15, and projecting inwardly, are the studs 20, one end of which projects into the nuts 21 lying within the recesses 22 in said roll carrier and held in position by the screws 23 threaded into the ends of said studs. That portion 32 of the shank of the stud 20 that engages the nut 21 is preferably squared in cross section so that there is no relative rotation of these parts. Rotatably mounted on the inner ends of said studs are the eccentric rolls 24, which are hollow and contain a coil spring 25, the inner end 26 of which is fixed to the stud 20 and the outer end 27 to the roll 24. A cap 28 secured to the face of said roll covers the recess and the spring therein, being secured in place by the screw 29 threaded into the stud 20, and by the screws 30 that are threaded into the rolls 24.

In operation, as the link 17 imparts an oscillating movement to the roll carrier 15 in the direction shown by the arrow in Fig. 1, the studs 20 thereon move in the direction of the arrow shown in Fig. 3, at which time the spring 25 within the rolls 24 moves the rolls upon their eccentric mounting so that the periphery thereof upon the high side impinges against the inner face 31 of the recess 13 in the roll case 11, thereby imparting movement to said roll case and through it to the shaft 10. Upon the reverse movement of the link 17 the rolls 24 rotate upon their eccentric mounting away from the face 31 and thereafter the said roll carrier can run free without imparting motion to the shaft 10. As soon, however, as the direction of movement of the link 17 is reversed the operations above described are repeated and motion is again imparted to the shaft 10. To vary the frictional engagement of the rolls against the roll case the relative position of the studs about their axis may be varied by loosening the screw 23 and turning the studs through the nuts 21 until the new position is obtained when the parts are then again locked by the screw 23. By this action the tension of the spring in relation to the bite of the rolls against the roll case is varied.

By this construction an intermittent and positive motion is imparted to the shaft 10 from the operating mechanism through the link 17. No pawls or ratchets are required and the mechanism runs comparatively free and absolutely noiseless. If it is desired to rotate the shaft 10 in the direction opposite from that above described, the springs 25 are removed from the rolls and their position reversed. The stud 20 is then rotated in the carrier 15 and the rolls are now in a position where the high side thereof is on the side opposite to that formerly occupied by it, and as shown in Fig. 4 of the drawings. Obviously by this action the operations above described will be repeated except that the grip of the rolls will now be upon the opposite stroke of the link 17.

There are minor changes and alterations that can be made within my invention, aside from those herein suggested, and I would therefore have it understood that I do not limit myself to the exact construction herein shown and described, but claim all that falls fairly within the spirit and scope of my invention.

Having described my invention, what I claim as new and desire to secure by Letters Patent, is:—

1. In mechanism of the character described, the combination with a driven shaft; of a member connected therewith having a friction face thereon; a carrier; means for actuating said carrier; a stud; a roll eccentrically mounted on said stud and engaging said friction face when said carrier is moved in one direction; means for moving said roll upon its pivot mounting, and means for adjustably securing said stud in said carrier whereby the friction of said roll against said friction face may be varied.

2. In mechanism of the character described, the combination with a driven shaft; of a member connected therewith having a friction face thereon; a carrier; means for actuating said carrier; a stud connected with said carrier; a roll eccentrically mounted on said stud and engaging said friction face when said carrier is moved in one direction; and a yielding connection between said roll and stud, the engagement of said stud and roll being such as to permit a variation of the position of the latter relatively to the former, whereby the point and direction of the frictional engagement of the roll and friction face will be reversed.

3. In mechanism of the character described, the combination with a driven shaft; of a member connected therewith having a friction face thereon; a carrier; means for actuating said carrier; a roll support connected with said carrier; a roll eccentrically mounted on said carrier and engaging said friction face, when said carrier is moved in one direction; means for securing said support whereby its position relative to said carrier may be varied; a coil spring within said roll having contact at one end with said roll, and at the other end with said support; and a closure member secured to said roll and covering said spring.

In testimony whereof I have hereunto affixed my signature.

PASQUALE PASQUARIELLO.